United States Patent [19]

Komarek

[11] 4,028,035

[45] June 7, 1977

[54] FRAMELESS BRIQUETTING MACHINE

[75] Inventor: Karl R. Komarek, Chicago, Ill.

[73] Assignee: K. R. Komarek, Inc., Elk Grove Village, Ill.

[22] Filed: Jan. 27, 1976

[21] Appl. No.: 652,776

[52] U.S. Cl. ................................ 425/363; 425/237; 425/367; 425/DIG. 235; 100/168; 100/170; 100/176; 44/10 R; 75/44 R; 308/207 R

[51] Int. Cl.² ........................................ B29C 15/00

[58] Field of Search .......... 425/135, 136, 149, 194, 425/141, 363, 365, 367, 368, 237, DIG. 235; 100/158, 168, 170, 176; 72/245, 21, 8; 44/10 R, 14; 75/44 R; 308/207 R

[56] References Cited

UNITED STATES PATENTS

| | | | |
|---|---|---|---|
| 3,134,156 | 5/1964 | Komarek | 100/170 |
| 3,845,708 | 11/1974 | Liebert | 100/176 |
| 3,921,514 | 11/1975 | Biondetti | 100/176 |
| 3,936,258 | 2/1976 | Lake | 425/367 |
| 3,949,650 | 4/1976 | Blatt et al. | 92/108 |

*Primary Examiner*—Robert L. Spicer, Jr.
*Attorney, Agent, or Firm*—Finnegan, Henderson, Farabow and Garrett

[57] ABSTRACT

An industrial-sized briquetting press having two independent bearing housings for supporting the drive shafts of the briquette-forming rolls. One of the bearing housings is rigidly mounted and the other is pivotally mounted to the first by a pivot located midway between the longitudinal axes of the drive shafts. The axes are substantially parallel and the pivotally mounted housing moves in the plane of the axes. The rolls are biased together by hydraulic cylinders. Connecting rods attached to the rigidly mounted bearing housing, slidably passing through the pivotally mounted bearing housing and hollow piston rods of the hydraulic cylinders, and supporting the hydraulic cylinders prevent movement of the briquette-forming rolls in relative longitudinal and lateral directions. The press has no overall frame permitting easy access for repair and maintenance and the pivot is demountable permitting removal of the pivotally mounted bearing housing.

21 Claims, 8 Drawing Figures

FRAMELESS BRIQUETTING MACHINE

BACKGROUND OF THE INVENTION

1. Field of the Invention

This invention relates to a briquetting press and more particularly to an industrial-sized briquetting press. The press includes apparatus for improving contact between the peripheral surfaces of the briquette-forming rolls and for improving the accessibility of the components of the press for maintenance and repair.

2. Description of the Prior Art

A briquetting press produces briquettes by compressing particulate material between two cooperating rolls, the peripheral surfaces of which contain cavities into which the particulate material is compressed. In order to produce briquettes of uniform shape, the lines of tangency of the peripheral surfaces of the rotating rolls must be as close to parallel as possible at the point where the particulate material is compressed in the cavities. However, the insertion of the particulate material between the peripheral surfaces of the rolls causes the rolls to spread apart. Accordingly, to minimize the splitting, shearing or deforming of briquettes, there must be a means for permitting the rolls to separate while keeping the lines of tangency of the peripheral surfaces of the rolls substantially parallel at the point where the briquettes are formed. The radii of the rolls should be maintained substantially in the original plane, that is, the plane normal to the plane containing the axes of rotation of the rolls.

By way of explanation, consider two points, one on each of the peripheral surfaces of the rolls, which are in a plane defined by lines of radius of the rolls and which are opposite each other when the surfaces are together at the briquette-forming point. These two points are also on lines which are mutually tangent to the surfaces of the rotating rolls and perpendicular to the plane formed by the lines of radius of the rolls. Ideally, when the rolls spread apart due to insertion of particulate material, the two points should remain in their original plane and the separated lines of tangency passing through the two points should remain parallel.

Achievement of the ideal is not presently feasible for large briquetting machines. The alternative is a design which, during roll separation, reduces the deviation of the two points from their original plane to a minimum and keeps the projected angle between the lines of tangency as close to zero as possible.

The prior art devices attempted to solve the separation problem by permitting both rotating rolls to articulate about points on the longitudinal axis of the drive shafts of the rotating rolls. The farther the point was from the roll, the less arc the rolls traveled and thus the deviation of the points from their original plane and the angle between the lines of tangency on the surfaces was reduced. While this design reduced the deformation of briquettes, it proved to be inadequate as the diameter of the rotating rolls was increased.

Having the point of articulation on the longitudinal axis of the drive shaft of the rolls was not satisfactory for large, industrial-sized briquetting presses. Assume, for the sake of comparison, that the radius of articulation of the smaller briquette-forming rolls is equal to that necessary for the larger briquette-forming rolls. If, in both cases, when the rolls spread apart they travel through the same number of degrees of arc, the reference points on the surfaces of the larger rolls deviates farther from their original plane than do the reference points on the surfaces of the smaller rolls. In this situation, while the angle between the lines of tangency of the small rolls and between the lines of tengency of the large rolls is the same, the resulting deformation of the briquettes is more significant with the larger rolls since larger briquettes are formed. Furthermore, since the reference points deviate farther from their original plane, the briquette-forming cavities on the sides of the rolls away from the point of articulation are farther apart thereby producing a briquette of reduced and irregular density.

The briquetting press is greatly simplified by articulating only one briquette-forming roll. However, if the articulated roll articulates about a point on the longitudinal axis of its drive shaft, with large rolls the deformation of briquettes is even more significant than when both rolls are articulated. This is because the reference point on the surface of the single articulated roll deviates substantially from its original plane and, unlike a press where both rolls are articulated, the briquette-forming cavities in the surfaces of the rotating rolls are no longer in complementary relationship to each other since the reference point on the non-articulated rotating roll remains in the original plane.

Therefore, in order to design an industrial-sized briquetting press of simplified construction, it is very desirable to use a single articulating roll and reduce the deviation of the reference point on the surface of that roll from its original plane to an acceptable minimum. The present invention alleviates many of the difficulties encountered when using large briquetting rolls. By placing the point of articulation on a line which is parallel to and substantially midway between the axes of rotation of the drive shafts of the briquette-forming rolls and which is substantially tangent to both rolls and by articulating only one roll, roll deviation from the ideal and the concommitant briquette deformation is significantly reduced thus making possible the use of large rolls.

Prior art briquetting presses, besides being limited in size, are generally complicated in structure and usually enclosed in a housing making access to the press for repair or maintenance difficult. U.S. Pat. No. 3,134,156 is an example of the complicated design and all-encompassing housing.

Besides the necessity for repair and maintenance, it is frequently necessary to change the briquette-forming cavities in the peripheries of the rolls or to change the rolls themselves. Many of the prior art briquetting presses made it difficult to remove the rolls or change the peripheral cavities in the rolls.

Another difficulty encountered in prior art briquetting presses, especially in large presses utilizing significant pressure, is the movement of the briquetting rolls relative to each other during the briquetting process. In order to produce uniform briquettes in size, shape and density, it is necessary that the briquetting cavities in the periphery of the rolls be consistently in cooperative relationship. Any deviation of the rolls in a direction parallel to the longitudinal axes of the roll shafts or normal to the plane containing the shafts will cause the production of deformed, cracked, sheared or unusable briquettes.

Furthermore, prior art briquetting presses were deficient in their application of briquetting pressure in that the pressure was inconsistent, thereby producing briquettes of inconsistent density. Prior art briquetting presses providing inconsistent pressure and permitting periodic deviation of the briquetting rolls from their cooperating relationship produced a significant percentage of unacceptable briquettes.

SUMMARY OF THE INVENTION

In accordance with the instant invention, the press for forming briquettes of particulate material between the peripheral surfaces of a pair of rotating rolls utilizes a pair of bearing housings for rotatably carrying the roll drive shafts in substantially the same plane. One of the bearing housings is rigidly mounted, preferably to a base, and the other bearing housing is pivoted to the rigidly mounted bearing housing for rotating in the plane containing the shafts, the pivot point being located substantially midway between the longitudinal axes of the shafts. The rotating rolls are biased into substantially tangential contact.

Preferably, one or more hydraulic cylinders provide an adjustable, constant force causing the peripheral surfaces of the rotating rolls to come into substantially tangential contact. In addition to providing the biasing force, the hydraulic cylinders provide a means for releasing the force, such as a pressure-actuated by-pass valve to prevent damage to the press in the event of an over-load of particulate material between the peripheral surfaces of the rotating rolls.

It is preferred that the hydraulic cylinders provide their biasing force by means of hollow piston rods. It is also preferred that a connecting rod be provided for each of the hydraulic cylinders, each connecting rod being attached at one end to the ridigly mounted bearing housings, slidably passing through slots in the pivotally mounted bearing housing, slidably passing through the hollow piston rods, and being attached, at their ends, to and supporting the hydraulic cylinders on the side of the pivotally mounted bearing housing remote from the rigidly mounted bearing housing. The force of the hydraulic cylinders being exerted by means of piston rods on the pivotally mounted bearing housing acts in an opposite direction on the rigidly mounted bearing housing by means of the connecting rods, thereby tending to bring the rolls into substantially tangential contact.

In a preferred embodiment of the press, the rotating rolls are mounted for rotation on one end of the shafts extending beyond the bearing housings, the bearing housings are pivotally joined at the other end remote from the rolls, and a pair of hydraulic cylinders and a pair of connecting rods are located at and act upon the end of the bearing housing proximate to the rolls. This embodiment may be arranged such that the axes of the elongated shafts are substantially in the same horizontal plane and the connecting rods and piston rods are substantially parallel to that horizontal plane and normal to the axes of the elongated shafts. Or, this embodiment may be arranged such that the axes of the pair of elongated shafts are substantially in the same vertical plane, the connecting rods and piston rods substantially parallel to the vertical plane and normal to the axes of the shafts, and the rigidly mounted bearing housing is below the pivotally mounted bearing housing.

It may be preferred in another embodiment of the press that the bearing housings be divided into first and second spaced sections, the sections supporting opposite ends of the elongated shafts and the rolls being mounted for rotation on the elongated shaft between the first and second sections. In this embodiment, the pivotally mounted bearing housing is pivotally joined to the rigidly mounted bearing housing at their second sections. Further, in this embodiment, connecting rods are rigidly attached respectively to each side of each section of the rigidly mounted bearing housing, slidably passing through slots in each side of each section of the pivotally mounted bearing housing, slidably passing through the hollow piston rods and are attached to and support each of the four hydraulic cylinders. The hydraulic cylinders act by means of the hollow piston rods on the respective sections of the pivotally mounted bearing housing and act upon the respective sections of the rigidly mounted bearing housing in an opposite direction by means of the connecting rods, thereby biasing the rotating rolls into tangential contact.

In this second embodiment, the axes of the elongated shafts may be substantially in the same horizontal plane or substantially in the same vertical plane.

Preferably, the means for rotating the elongated shafts is provided and acts on the shafts at their ends remote from the rotating rolls. In the second embodiment, the means for rotating the elongated shafts acts on the shafts at the ends of the shafts extending from the first section of the respective bearing housings.

It is also preferred that particulate material be introduced between the rotating rolls by means of a feeder which feeds particulate material along a line normal to the plane containing the longitudinal axes of the elongated shafts and substantially tangent to both rotating rolls.

In both embodiments it may be preferred that the pivot be demountable for detaching the pivotally mounted bearing housing and removing it from the press.

The embodiments of the invention accomplish the object of providing a large, industrial-sized briquetting press of a simplified design which will produce uniform briquettes of the desired shape by reducing to a minimum the deviation from an ideal separation where the lines of radii of the rotating rolls remain in planes normal to the plane containing the roll axes and where the lines tangent to the surfaces of the rolls which are normal to the planes containing the lines of radii of the rotating rolls remain parallel.

The invention is intended to provide an industrial-sized briquetting machine of simple design which overcomes deficiencies of prior art machines. The shearing, splitting and deforming of briquettes which occurs in prior art presses are overcome by providing an improved means for permitting separation of the rotating rolls.

An additional advantage of the present invention is its simplified construction. Having no structural housing enclosing the briquetting press, access to the briquetting press mechanisms for maintenance and repair is relatively simple. Furthermore, the instant invention provides a briquetting press wherein the press rolls are readily accessible for removal or for the changing of briquetting cavities in their peripheries. In addition, the pivot point is demountable permitting the removal of the pivotally mounted bearing housing from the briquetting press.

The briquetting press as disclosed herein also provides constant, uniform pressure between the briquette-forming rolls in order to produce briquettes of uniform density. Furthermore, the press incorporates means for restricting any motion of the briquette-forming rolls in relative longitudinal or lateral directions, thus keeping the cavities in the peripheries of the rolls in complementary relationship and preventing the production of deformed briquettes.

Additional purposes and advantages of the invention will be set forth in part in the description which follows, and in part will be obvious from the description, or may be learned by practice of the invention. The purposes and advantages may be realized and obtained by means of the instrumentalities and combinations particularly pointed out in the appended claims.

The accompanying drawings, which are incorporated in and constitute a part of this specification, illustrate two embodiments of the invention, and together with the description serve to explain the principles of the invention.

DETAILED DESCRIPTION OF THE INVENTION

In accordance with the invention, the press has a pair of elongated shafts for rotating briquette-forming rolls, the shafts being substantially parallel.

Figure 1:
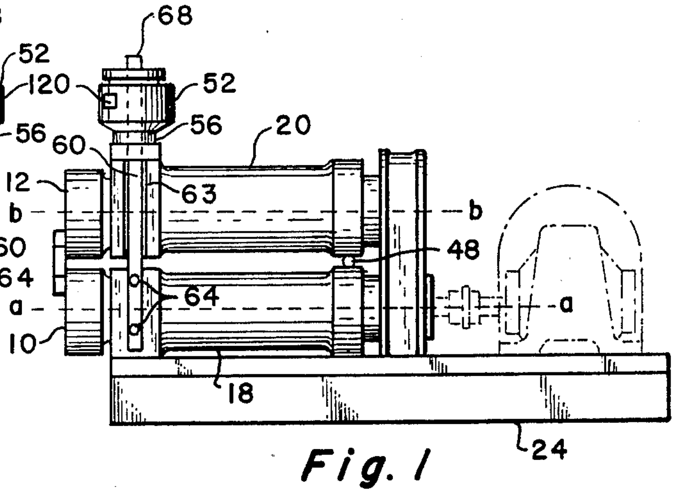
FIG. 1 is a side view of the embodiment of the briquetting press of this invention having two one-piece, vertically disposed bearing housings.

In the embodiment depicted in FIG. 1, the elongated shafts the longitudinal axes of which are represented by lines *a—a* and *b—b*, are substantially parallel, vertically spaced and each mounted in a one-piece bearing housing. The shafts *a—a* and *b—b* rotate a pair of cooperating, briquette-forming rolls 10 and 12 which are mounted at one end of the shafts *a—a* and *b—b* projecting beyond the end of the respective bearing housings.

Figure 4:
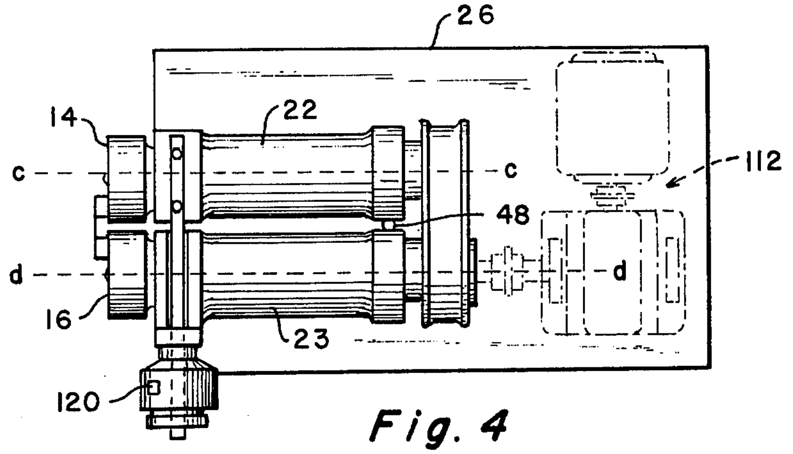
FIG. 4 is a top view of the embodiment of the briquetting press of this invention having two one-piece bearing housings in a horizontal relationship.

It may be preferred for some types of operations that the elongated parallel shafts of this embodiment be horizontally spaced, as depicted in FIG. 4. In this arrangement, the shafts *c—c* and *d—d* rotate a pair of briquette-forming rolls 14 and 16. As the description of the embodiment wherein the shafts are each mounted in a one-piece bearing housing is substantially the same whether the shafts are vertically or horizontally spaced, only a description of the vertically spaced arrangement will be provided unless differences exist.

Figure 7:
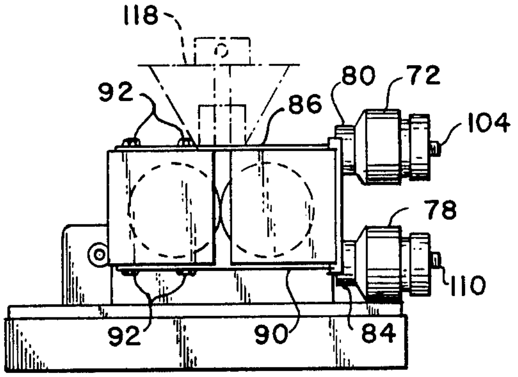
FIG. 7 is an end view of the embodiment shown in FIG. 5 showing the feeder.
Figure 6:
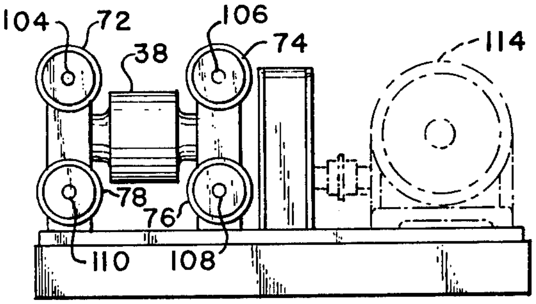
FIG. 6 is a side view of the briquetting press shown in FIG. 5.
Figure 8:
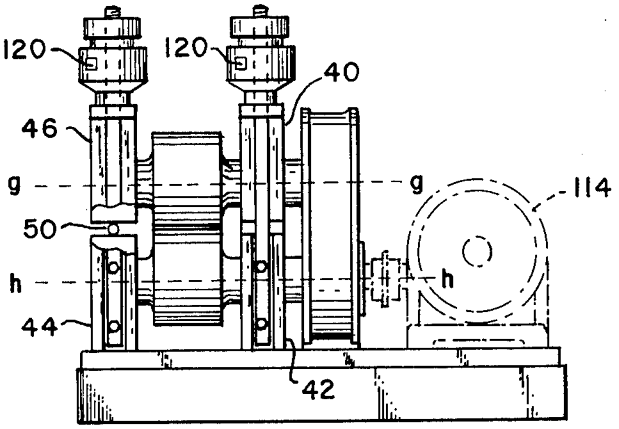
FIG. 8 is a side view of the embodiment of the briquetting press of this invention having two two-piece bearing housings in vertical relationship.

It may be preferred that the invention be incorporated in a second embodiment depicted in FIGS. 5 through 8 wherein the shafts are each mounted in two-piece bearing housings. The parallel shafts may be horizontally spaced, as *e—e* and *f—f* (FIG. 5) or vertically spaced, as *g—g* and *h—h* (FIG. 8).

In accordance with the invention, the press provides a pair of bearing housings for rotatably mounting the shafts, one of the bearing housings being rigidly mounted. In the embodiment depicted in FIG. 1, the bearing housings 18 and 20 are in vertical relationship with the rigidly mounted bearing housing 18 being the lower one. The shaft *a—a* is rotatably carried by the rigidly mounted bearing housing 18 and one end of the shaft *a—a* extends beyond the end of the bearing housing 18 and carries the briquette-forming roll 10. The shaft *b—b* is rotatably carried by the pivotally mounted bearing housing 20 and one end of the shaft *b—b* extends beyond the bearing housing 20 to carry the roll 12.

Where it is preferred that the shafts be in horizontal relationship (FIG. 4), one of the bearing housing 22 is rigidly mounted. It is preferred that the rigidly mounted bearing housings 18 and 22 be mounted on a base 24 and 26, respectively.

Figure 5:
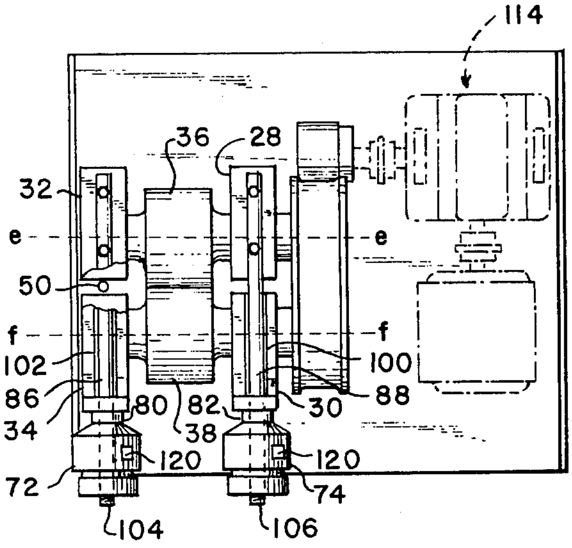
FIG. 5 is a top view of an embodiment of the briquetting press of this invention having two two-piece bearing housings in horizontal relationship.

In the second embodiment, as best seen in FIG. 5, the bearing housings are each divided into first, 28 and 30, and second, 32 and 34, sections, the sections supporting opposite ends of the elongated shafts *e—e* and *f—f*. The shafts *e—e* and *f—f* are for rotating briquette-forming rolls 36 and 38. The rolls 36 and 38 are mounted for rotation on the shafts *e—e* and *f—f* between the first, 28 and 30, and the second, 32 and 34, sections of the bearing housings, respectively.

While the second embodiment depicted in FIG. 5 depicts the shafts in horizontal relationship, it may be preferred for some types of operations that the second embodiment have the shafts in vertical relationship. FIG. 8 depicts a second embodiment where the shafts *g—g* and *h —h* are parallel and vertically spaced. In this arrangement, the bearing housings are divided into first sections, 40 and 42, and second sections, 44 and 46, the rigidly mounted bearing housing sections 42 and 44 rotatably mount the shaft *h—h* and the pivotally mounted bearing housing sections 40 and 46 rotatably mount the shaft *g—g*. As the description of the embodiment wherein the shafts are each mounted in a two-piece bearing housing is substantially the same whether the shafts are vertically or horizontally spaced, only a description of the horizontally spaced arrangement will be provided, unless differences exist.

In accordance with the invention, means for pivoting the other bearing housing to the rigidly mounted bearing housing for motion in the plane of the shafts is provided. The pivoting means is located substantially midway between the axes of the shafts.

In the first embodiment wherein the bearing housing for each shaft is in one piece (FIG. 1), the pivot 48 may be any appropriate device which will permit free movement of the pivotally mounted bearing housing 20 and which will support that bearing housing. As depicted, the pivot is a cylindrical bar, the axis of which is normal to the plane of the shaft axes.

In the second embodiment wherein the bearing housing for each shaft is in two pieces (FIG. 5), the pivot 50 joins the pivotally mounted bearing housing 28 and 32 to the rigidly mounted bearing housing 30 and 34 at the second sections 32 and 34 thereof. This pivot may also be any appropriate device which will permit free movement of the pivotally mounted bearing housing 28 and 32. The pivot shown is a cylindrical bar located between the two bearing housing sections 32 and 34 or 44 and 46, the bar extending between the connecting rods on each side of said sections.

It is preferred that the pivot 48 and 50 be demountable for detaching the pivotally mounted bearing housing 20 and 28 and 32 from the rigidly mounted bearing housing 18 or 30 and 34 and removing the former from the press.

This location of the pivots 48 and 50 midway between the shafts *a—a* and *b—b* or *e—e* and *f—f* permitting rotation of the pivotally mounted bearing housings 20 or 28 and 32 in the same plane as the shafts *a—a* and *b—b* or *e—e* and *f—f* serves, in accordance with the invention, to reduce deviation of the rolls 12 or 36 from the ideal position where the lines tangent to the peripheries of both rolls are in parallel relation and the lines of radius of the rolls are in planes normal to the plane containing the axes of the rolls.

It is the location of the pivots 48 and 50 midway between and in the same plane of the axes *a—a* and *b—b* or *e—e* and *f—f* of the elongated shafts which overcomes one of the principal deficiencies in prior art briquetting presses. As stated above, the description of the pivotal arrangement as to vertically disposed shafts applies equally to horizontally disposed shafts.

In accordance with the invention, the rolls are biased together in substantially tangential contact. Preferably, the biasing means comprises a hydraulic means providing an adjustable, constant force, In order to prevent damage to the press, it is also preferred that the hydraulic means include an automatic release mechanism, such as a pressure-actuating by-pass valve, which releases the constant biasing force in the event an overload of particulate material is introduced between the rolls. It is preferred that the hydraulic means comprise a plurality of hydraulic cylinders.

Figure 2:
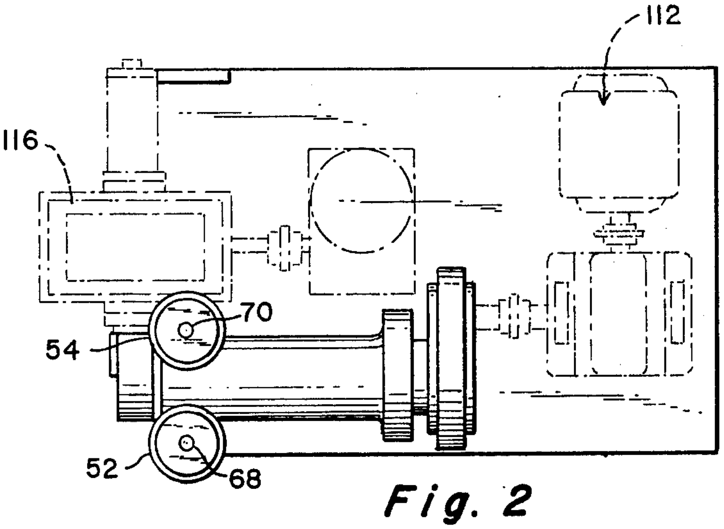
FIG. 2 is a top view of the briquetting press in FIG. 1.
Figure 3:
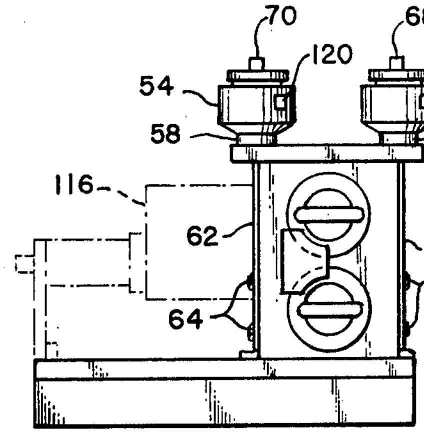
FIG. 3 is an end view of the press in FIG. 1 showing the rotating rolls and feeder.

In the first embodiment wherein the housings for the shafts are in one piece, as best seen in FIGS. 2 and 3, it is preferred that the biasing force be provided by two hydraulic cylinders 52 and 54 each providing the force by means of hollow piston rods 56 and 58.

It is also preferred that the first embodiment include two connecting rods 60 and 62 as best seen in FIGS. 1 and 3. The connecting rods 60 and 62 are attached at one end, by any means such as bolts 64, to each side, respectively, of the rigidly mounted bearing housing 18. The connecting rods 60 and 62 slidably pass through slots 63 in each side of the pivotally mounted bearing housing and slidably pass through the hollow piston rods 56 and 58. The other end 68 and 70 of the connecting rods 60 and 62 pass through the hydraulic cylinders 52 and 54 and are attached to and support the hydraulic cylinders 52 and 54 on the side of the pivotally mounted bearing housing 20 remote from the rigidly mounted bearing housing 18. The force of the hydraulic cylinders 52 and 54 is exerted by means of the piston rods 56 and 58 on the pivotally mounted bearing housing 20 and, in an opposite direction, on the rigidly mounted bearing housing 18 by means of the connecting rods 60 and 62 thereby tending to bring the rolls 10 and 12 into substantially tangential contact.

In the second embodiment wherein the housings for the shafts are in two pieces, it is preferred that the hydraulic means be four hydraulic cylinders 72, 74, 76 and 78, two of the hydraulic cylinders 74 and 76 being located on and acting respectively upon each side of the first section 30 of the pivotally mounted bearing housing and the other two of the hydraulic cylinders 72 and 78 being located at and acting respectively upon each side of the second section 34 of the pivotally mounted bearing housing.

In the second embodiment it is also preferred that the hydraulic cylinders 72, 74, 76 and 78 have hollow piston rods 80, 82 and 84 as seen in FIGS. 5 and 7. It is also preferred that four connecting rods be provided, three of which, 86, 88 and 90 can be seen in FIGS. 5 and 7. The connecting rods 86, 88 and 90 and the one not shown are rigidly attached at one end respectively to each side of each of the sections 28 and 32 of the rigidly mounted bearing housing. Any convenient means for attaching the connecting rods 86, 88 and 90 and the one not shown to the sections 28 and 32 of the rigidly mounted bearing housing may be used, such as bolts 92, as best seen in FIG. 7.

The connecting rods 86, 88, 90 and the one not shown slidably pass through slots 100, 102 and two not shown in each side of each section 30 and 34 of the pivotally mounted bearing housing. The connecting rods pass through the hollow piston rods and are attached at their ends 104, 106, 108 and 110 to and support the hydraulic cylinders 72, 74, 76 and 78, respectively.

The forces provided by the hydraulic cylinders 72, 74, 76 and 78 act on the sides of each section 30 and 34 of the pivotally mounted bearing housing by means of the hollow piston rods 80, 82 and 84 and one not shown and on each side of each section 28 and 32 of the rigidly mounted bearing housing in an opposite direction by means of the connecting rods 86, 88, 90 and one not shown, thereby biasing the rotating rolls 36 and 38 into substantially tangential contact.

The connecting rods in each embodiment are provided in order to prevent relative lateral movement between the shafts and the pivot means in each embodiment, besides permitting pivotal rotation of the pivotally mounted bearing housing, tends to prevent relative longitudinal movement between the shafts, thereby insuring continual complementary alignment of the rotating rolls. The hydraulic cylinders in each embodiment provide a constant hydraulic force biasing the rotating rolls into tangential contact and tending to prevent variations in pressure between the rotating rolls.

It is preferred that means be provided for rotating the elongated shafts. In the first embodiment, the means generally 112 acts on the elongated shafts *a—a* and *b—b* at their ends remote from the rotating rolls 10 and 12. In the second embodiment, means generally 114 for rotating the elongated shafts *e—e* and *f—f* act on the ends of the elongated shafts *e—e* and *f—f* which extend beyond the first sections 28 and 30 of each of the bearing housings. As depicted, the means for rotating the shafts may be any number of motor, speed reducer, flexible coupling and gear arrangements or other means such as belt or chain drive, as well known in the art.

It is also preferred in both embodiments that particulate material be introduced between the rolls by a feeder 116 and 118 which introduces particulate material along a line normal to the plane containing the longitudinal axes *a—a*, *b—b*, *e—e* and *f—f* of the elongated shafts and substantially tangent to both rotating rolls 10 and 12 or 36 and 38.

The operation of both embodiments is substantially similar whether in horizontal or vertical relationship. In describing the operation of the press, reference will be made to the first embodiment as depicted in FIGS. 1, 2 and 3.

In operation, a constant pressure is applied by the hydraulic cylinders 52 and 54 to bias the rolls 10 and 12 into substantially tangential contact at a point where the complementary cavities in the peripheries of the rolls 10 and 12 cooperate. The feeder 116 introduces particulate material into the cavities just prior to the tangential contact point. The pressure created by the particulate material tends to force the upper roll 12 against the constant force provided by the hydraulic cylinders 52 and 54 and the particulate material is, thereby, compressed into briquettes.

Should the quantity of particulate material between the rotating rolls 10 and 12 be greater than planned for, the release means 120 (FIG. 3) incorporated in the hydraulic cylinders will release the pressure exerted by the hydraulic cylinders 52 and 54 to prevent damage to the press.

The pivot 48 allows the pivotally mounted bearing housing 20 and the upper roll 12 to move in the vertical plane defined by the axes of the elongated shafts *a—a* and *b—b*. It can be seen from the description above that, without particulate material between the rolls, the biasing force of the hydraulic cylinders 52 and 54 would tend to bring the rolls 10 and 12 into direct contact. As the particulate material is introduced between the rolls 10 and 12, the upper roll 12 is premitted to move in a vertical direction by means of the pivot 48.

The pressure between the rolls must vary depending on the material being compressed and the size of the briquettes. This is accomplished by adjusting the force supplied by the hydraulic cylinders 52 and 54.

As the operation continues, forces tend to cause the rolls to move laterally and longitudinally relative to each other. This is prevented by the connecting rods 60, 62, and two not shown and by the pivot 48. This insures the continuing complementary relationship of the briquette-forming cavities in the peripheries of the briquetting rolls 10 ad 12.

I claim:

1. A press for forming briquettes of particulate material between the peripheral surfaces of a pair of rolls, comprising:

a. a pair of elongated shafts for rotating said rolls, said shafts being substantially parallel;

b. a pair of bearing housings for rotatably mounting said shafts, one of said bearing housings being rigidly mounted;

c. means for pivoting the other of said bearing housings to the rigidly mounted bearing housing for rotation in the plane of said shafts, said pivoting means being located substantially midway between the axes of said shafts; and d. means for biasing said rolls into substantially tangential contact, said biasing means including pressure-responsive means proximate said rolls and rods slidably passing through said pivotally mounted bearing housing for connecting said rigidly mounted bearing housing to said pressure-responsive means.

2. The press as in claim 1 wherein said pressure-responsive means comprises hydraulic means providing an adjustable, constant force and wherein said biasing means also includes means for releasing said force in the event of an overload of particulate material between said rolls.

3. The press as in claim 2 wherein said hydraulic means comprises a plurality of hydraulic cylinders, each providing said adjustable, constant force.

4. The press in claim 3 also including a hollow piston rod interacting with each of said hydraulic cylinders, and wherein said connecting means comprises a plurality of connecting rods, each attached at one end to said rigidly mounted bearing housing, said pivotally mounted bearing housing having slots through which said connecting rods slidably pass, and said connecting rods passing through said hollow piston rods and being attached, at their other ends, to and supporting said hydraulic cylinders on the side of said pivotally mounted bearing housing remote from said rigidly mounted bearing housing, said force of said hydraulic cylinders being exerted by means of said piston rods on said pivotally mounted bearing housing and in an opposite direction on said rigidly mounted bearing housing by means of said connecting rods thereby tending to bring said rolls into substantially tangential contact.

5. The press as in claim 4 wherein there are two of said hydraulic cylinders and two of said connecting rods, one each of said hydraulic cylinders and said connecting rods being located on each side of the plane of said shafts.

6. The press as in claim 5 wherein said rolls are mounted for rotation on one end of said shafts extending beyond said bearing housings, wherein said pivoting means joins said rigidly and pivotally mounted bearing housings at their ends remote from said rolls, and wherein said hydraulic cylinders and said connecting rods are located at and act upon the end of said bearing housings proximate said rolls.

7. The press as in claim 6 wherein the axes of said pair of elongated shafts are substantially in the same horizontal plane and said connecting rods and said piston rods are substantially parallel to said horizontal plane and normal to the axes of said elongated shafts.

8. The press as in claim 6 wherein the axes of said pair of elongated shafts are substantially in the same vertical plane, wherein the connecting rods and piston rods are substantially parallel to said vertical plane and normal to the axes of said elongated shafts, and wherein said rigidly mounted bearing housing is below said pivotally mounted bearing housing.

9. The press as in claim 4 wherein said bearing housings are each divided into two spaced sections, said sections supporting opposite ends of said elongated shafts, wherein said rolls are mounted for rotation on said elongated shafts between said sections supporting said shafts, and wherein said pivotally mounted bearing housing is pivotally joined to said rigidly mounted bearing housing at a pair of aligned sections.

10. The press as in claim 9 wherein there are four hydraulic cylinders and four connecting rods, one of each of said hydraulic cylinders and said connecting rods being located on each side of each section of said bearing housing, said connecting rods being respectively attached to each side of each section of said rigidly mounted bearing housing and slidably passing through the slots in each side of each section of said pivotally mounted bearing housing and through respective hollow piston rods of each hydraulic cylinder, and wherein said hydraulic cylinders attached to said connecting rods act upon each section of said pivotally mounted bearing housing and act upon the respective sections of the rigidly mounted bearing housings in an opposite direction by means of the connecting rods thereby biasing the rotating rolls into tangential contact.

11. The press as in claim 10 wherein the axes of said pair of elongated shafts are substantially in the same horizontal plane and said connecting rods and said piston rods are substantially parallel to said horizontal plane and normal to the axes of said elongated shafts.

12. The press as in claim 10 wherein the axes of said pair of elongated shafts are substantially in the same vertical plane, wherein the connecting rods and piston rods are substantially parallel to said vertical plane and normal to the axes of said elongated shafts, and wherein said rigidly mounted bearing housing is below said pivotally mounted bearing housing.

13. The press as in claim 6 including means for rotating the elongated shafts and acting on said shafts at their ends remote from said rotating rolls.

14. The press as in claim 9 including means for rotating said elongated shafts and acting on said shafts at points on the other sides of said rolls from said pivot means.

15. The press as in claim 1 also including a feeder for introducing particulate material along a line normal to the plane containing the longitudinal axes of said elongated shafts and substantially tangent to both rotating rolls.

16. The press as in claim 1 wherein said pivot means is demountable for detaching said pivotally mounted bearing housing from said rigidly mounted bearing housing and removing said pivotally mounted bearing housing from said press.

17. The press as in claim 4 wherein said pivot means joining said bearing housings tends to prevent relative longitudinal movement between said shafts and wherein said connecting rods tend to prevent relative lateral movement between said shafts.

18. A press for forming briquettes of particulate material between the peripheral surface of a pair of rolls, comprising:

a. a base;

b. a pair of elongated shafts for rotating said rolls at a pair of aligned ends of the shafts, said shafts being substantially parallel and vertically disposed;

c. a pair of one-piece bearing housings for rotatably mounting said shafts, the lower of said bearing housings being rigidly mounted to said base;

d. a pivot joining the upper of said bearing housings to the rigidly mounted bearing housing at their ends remote from said rolls permitting movement of said pivotally mounted bearing housing in the vertical plane of the axes of said shafts, the pivot being located substantially midway between, and in the plane of, the axes of said shafts;

e. a pair of hydraulic cylinders each including a hollow piston rod and a pressure-actuated means for releasing hydraulic pressure;

f. a pair of connecting rods, the rods of said pair respectively being rigidly attached at one end to each side of the rigidly mounted bearing housing proximate said rolls and having the other end slidably passing through the respective side of the pivotally mounted bearing housing, through the hollow piston rod of a respective one of said pair of hydraulic cylinders, and attached to and supporting a respective one of said pair of hydraulic cylinders on the side of said pivotally mounted bearing housing remote from said rigidly mounted bearing housing, the force of said hydraulic cylinders being exerted on said pivotally mounted bearing housing by means of said hollow piston rods and on said rigidly mounted bearing housing in an opposite direction by means of said connecting rods thereby biasing said rolls into substantially tangential contact;

g. means acting on the ends of said shafts remote from said rolls for rotating said shafts in synchronized cooperation; and h. a feeder mounted on said base for introducing particulate material along a line normal to the plane containing the longitudinal axes of said shafts and substantially tangent to both rotating rolls.

19. The press as in claim 18 wherein the pivot is demountable for detaching said pivotally mounted bearing housing from said rigidly mounted bearing housing and removing said pivotally mounted bearing housing from said press.

20. A press for forming briquettes of particulate material between the peripheral surfaces of a pair of rolls, comprising:

a. a base;

b. a pair of elongated shafts for rotating said rolls, said shafts being substantially parallel and horizontally disposed;

c. a pair of two-sectioned bearing housings, said sections being spaced apart and supporting opposite ends of said elongated shafts and said rolls being mounted for rotation on said elongated shafts between said sections, one of said two-section bearing housings being rigidly mounted to said base;

d. a pivot joining the other of said two-section bearing housings to the rigidly mounted bearing housing at a pair of aligned sections permitting movement of said pivotally mounted bearing housing in the horizontal plane of the axes of said shafts, the pivot being located midway between, and in the plane of, the axes of said shafts;

e. four hydraulic cylinders each including a hollow piston rod and a pressure-actuated means for releasing hydraulic pressure;

f. four connecting rods, said rods respectively being rigidly attached at one end to each side of each section of the rigidly mounted bearing housing and having the other end slidably passing through the respective side of each section of the pivotally mounted bearing housing, through the hollow piston rod of a respective one of said hydraulic cylinders, and attached to and supporting said one of said hydraulic cylinders on the side of each section of the pivotally mounted bearing housing remote from said rigidly mounted bearing housing, the force of said hydraulic cylinders being exerted on said pivotally mounted bearing housing by means of said hollow piston rods and on said rigidly mounted bearing housing in an opposite direction by means of said connecting rods thereby biasing said rolls into substantially tangentail contact;

g. means acting on the ends of said shafts remote from said pivot for rotating said shafts in synchronized cooperation; and h. a feeder mounted on said rigidly mounted bearing housing for introducing particulate material along a line normal to the plane containing the longitudinal axes of said shafts and substantially tangent to both rotating rolls.

21. The press as in claim 20 wherein said pivot is demountable for detaching said pivotally mounted bearing housing from said rigidly mounted bearing housing and removing said pivotally mounted bearing housing from said press.

* * * * *

UNITED STATES PATENT AND TRADEMARK OFFICE
CERTIFICATE OF CORRECTION

PATENT NO. : 4,028,035

DATED : June 7, 1977

INVENTOR(S) : Karl R. Komarek

It is certified that error appears in the above-identified patent and that said Letters Patent are hereby corrected as shown below:

Column 9, line 65, after "press", insert ---as---.

Column 11, line 31, change "surface" to ---surfaces---.

Column 12, line 54, change "tangentail" to ---tangential---.

Signed and Sealed this

*Twenty-seventh* Day of *September 1977*

[SEAL]

*Attest:*

RUTH C. MASON
*Attesting Officer*

LUTRELLE F. PARKER
*Acting Commissioner of Patents and Trademarks*